US006923949B1

(12) United States Patent
Lai et al.

(10) Patent No.: US 6,923,949 B1
(45) Date of Patent: Aug. 2, 2005

(54) SYNTHESIS OF ZSM-48 CRYSTALS WITH HETEROSTRUCTURAL, NON ZSM-48, SEEDING

(75) Inventors: Wenyih F. Lai, Bridgewater, NJ (US); Richard B. Saunders, Wayne, NJ (US); Machteld M. Mertens, Boortmeerbeek (BE); Johannes P. Verduijn, Leefdaal (BE)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/795,108

(22) Filed: Mar. 5, 2004

(51) Int. Cl.[7] ............................................. C01B 39/48
(52) U.S. Cl. ...................... 423/709; 423/705; 423/708; 423/716
(58) Field of Search ............................... 423/709, 716, 423/708, 705

(56) References Cited

U.S. PATENT DOCUMENTS

| 4,423,021 A | * | 12/1983 | Rollmann et al. | 423/708 |
| 4,585,747 A | * | 4/1986 | Valyocsik | 502/62 |
| 5,961,951 A | * | 10/1999 | Kennedy et al. | 423/708 |

FOREIGN PATENT DOCUMENTS

| EP | 142317 A | * | 5/1985 | B01J 00/00 |

* cited by examiner

*Primary Examiner*—David Sample
(74) *Attorney, Agent, or Firm*—Joseph J. Dvorak

(57) ABSTRACT

Pure phase, high activity ZSM-48 crystals having a $SiO_2/Al_2O_3$ ratio of less than about 150/1, substantially free from ZSM-50 and Kenyaite, and fibrous morphology crystals. The crystals may further have a specific cross morphology. A method for making such crystals using heterostructural, zeolite seeds, other than ZSM-48 and ZSM-50 seeds.

12 Claims, 4 Drawing Sheets

SEM of ZSM-48 of Figure 4 at greater magnification

Figure 1: XRD pattern of ZSM-48

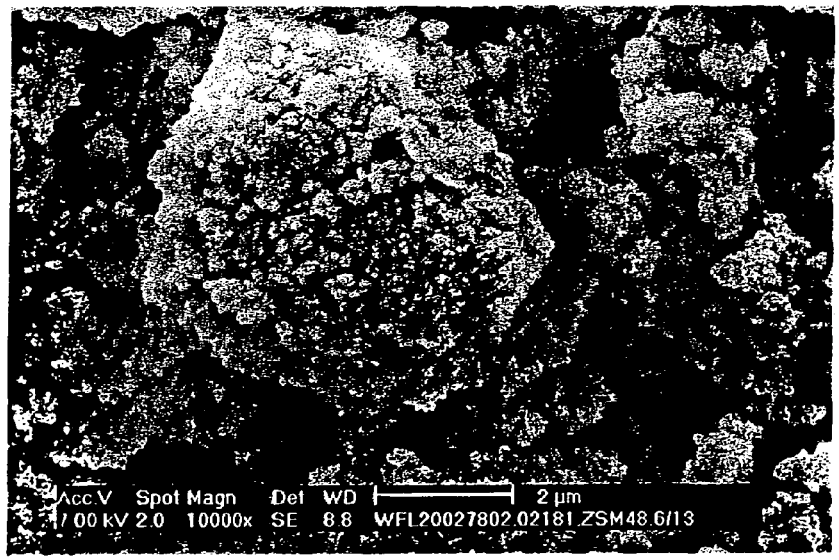
Figure 2: SEM of ZSM-48 crystal with SiO$_2$/Al$_2$O$_3$ of 70/1-90/1
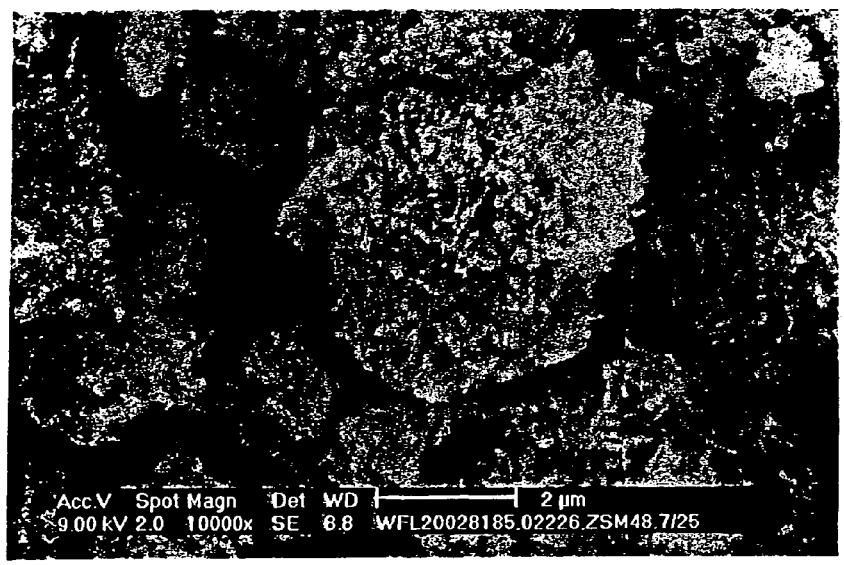
Figure 3: SEM of ZSM-48 crystal with SiO$_2$/Al$_2$O$_3$ < 70/1

Figure 4: SEM of ZSM-48 crystal of cross morphology (1.1 wt ppm)

Figure 5: SEM of ZSM-48 of Figure 4 at greater magnification

SYNTHESIS OF ZSM-48 CRYSTALS WITH HETEROSTRUCTURAL, NON ZSM-48, SEEDING

FIELD OF THE INVENTION

This invention relates generally to novel ZSM-48 crystals and their method of preparation. More specifically the invention relates to the use of non ZSM-48 seeding to prepare high activity, ZSM-48 crystals and to prepare cross morphology ZSM-48 crystals.

BACKGROUND OF THE INVENTION

Zeolitic materials may be both natural and synthetic materials. Zeolitic materials exhibit catalytic properties for various types of hydrocarbon reactions. Certain zeolitic materials are ordered, porous crystalline aluminosilicates having a definite crystalline structure as determined by X-ray diffraction. Within this structure there are a large number of smaller cavities which may be interconnected by a number of still smaller channels or pores. These cavities and pores tend to be uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Zeolites typically have uniform pore diameters of about 3 angstroms to about 10 angstroms. The chemical composition of zeolites can vary widely and they typically consist of $SiO_2$ in which some of the silica atoms may be replaced by tetravalent atoms such as Ti or Ge, by trivalent ions such as Al, B, Ga, Fe, or by bivalent ions such as Be, or by a combination of any of the aforementioned ions. When there is substitution by bivalent or trivalent ions, cations such as Na, K, Ca, $NH_4$ or H are also present.

Zeolites include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal, an alkaline earth metal cation, or an organic species such as a quaternary ammonium cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are usually occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), and zeolite ZSM-12 (U.S. Pat. No. 3,832,449), merely to name a few.

The $SiO_2/Al_2O_3$ ratio of a given zeolite is often variable. For example, zeolite X can be synthesized with $SiO_2/Al_2O_3$ ratio of from about 2 to about 3; zeolite Y, from about 3 to about 6. In some zeolites, the upper limit of $SiO_2/Al_2O_3$ ratio is unbounded. ZSM-5 is one such example wherein $SiO_2/Al_2O_3$ ratio is at least five. U.S. Pat. No. 3,941,871 discloses a crystalline metal organosilicate essentially free of aluminum and exhibiting an x-ray diffraction pattern characteristic of ZSM-5 type aluminosilicates. U.S. Pat. Nos. 4,061,724, 4,073,865 and 4,104,294 describe microporous, crystalline silicas or organosilicates of varying alumina and metal content.

U.S. Pat. No. 4,423,021 to Rollmann et al describes a method for synthesizing silico-crystal ZSM-48 using a diamine having four to twelve carbons as the directing agent. The composition is described as a silico-crystal and it includes very little, if any aluminum.

U.S. Pat. Nos. 4,397,827 and 4,448,675 to Chu also describes method for synthesizing a silico-crystal ZSM-48 including very little, if any, aluminum. The synthesis utilizes a mixture of an amine having from two to twelve carbons and tetramethylammonium compound as the directing agent.

U.S. Pat. No. 5,075,269 to Degnan et al describes silico-crystal ZSM-48 prepared with organic linear diquaternary ammonium compound as a template. The crystal morphology is illustrated in FIGS. 3 and 4 of the '269 patent and is described as having platelet-like crystal morphology at high silica/alumina ratios and aggregates of small irregularly shaped crystals at silica/alumina ratios below 200. In U.S. Pat. No. 5,075,269 this is compared with the crystal morphology of Rollmann et al (U.S. Pat. No. 4,423,021) in FIG. 1 and Chu (U.S. Pat. No. 4,397,827) in FIG. 2. FIGS. 1 and 2 show a rod-like or needle-like crystal morphology which is random and dispersed.

ZSM-48 is also described by R. Szostak, Handbook of Molecular Sieves, Van Nostrand Rheinhold, New York 1992, at pp. 551–553. Organics are listed as diquat-6, bis(N-methylpyridyl)ethylinium, diethylenetriamine, triethylenetetramine, tetraethylenepentamine, 1,4,8,11-tetra-aza-undecane, 1,5,9,13-tetra-aza-undecane, 1,5,8,12-tetra-aza-undecane, 1,3-diaminopropane, n-propylamine/$TMA^+$, hexane-diamine and triethylamine.

U.S. Pat. No. 5,961,951 to Kennedy et al describes a method for making ZSM-48 by crystallizing a reaction mixture consisting of a source of silica, a source of trivalent metal oxide, an alkali metal oxide, ethylenediamine and water.

ZSM-48 has been synthesized under a broad range of ratios of $SiO_2/Al_2O_3$ generally ranging from about 150/1 to about 600/1. Synthesis of high activity non-fibrous ZSM-48 crystals with lower $SiO_2/Al_2O_3$ ratios is desirable for the developments of selective olefin isomerization catalysts, near linear olefin catalysts, and lube dewaxing catalysts.

However, generally prior attempts to grow pure phase ZSM-48 at a ratio of $SiO_2/Al_2O_3$ of less than 150/1 have been unsuccessful for the most part and result in the formation of impurities, such as ZSM-50 and Kenyaite.

It is known that the crystallization of some zeolites proceeds only in the presence of seeds. Adding seed crystals to a crystallization system has typically resulted in increased crystallization rates. In other cases, the addition of seeds determines, to a great extent, the type of the crystallized zeolites and affects the resulting zeolite composition and changes the kinetics of the process. It is also known that pure phase ZSM-50 and ZSM-23 crystals can be synthesized from hydrothermal reactions with the addition of heterostructural seeds including ZSM-5, silicalite, X, Y and Mordenite as described in EP 0 999 182 A1, U.S. Pat. No. 6,342,200 B1, and U.S. Pat. No. 6,475,464.

SUMMARY OF THE INVENTION

The present invention overcomes some of the aforementioned problems of the prior art. It provides a method for making a pure phase, highly active ZSM-48 crystals substantially without fibrous morphology crystals and any other impurities. One aspect of the invention provides cross morphology ZSM-48 crystals and a method for making them.

The present invention is directed to a pure phase, high activity ZSM-48 and a method for its preparation. The product can be prepared from a reaction mixture which includes sources of a tetravalent element such as a silica, a trivalent metal oxide, an alkali metal oxide, a template (or directing agent) and heterostructural, zeolite seeds, other than ZSM-48 and ZSM-50 seeds, in a solvent phase which includes water. The mixture, in terms of mole ratios of oxides, has the following composition:

$XO_2/Y_2O_3$: 20/1 to 2500/1,
$OH^-/XO_2$: 0.1/1 to 2.0/1,
$R/XO_2$: 0.001/1 to 5.0/1,
$M^+/XO_2$: 0/1 to 2.0/1, and
$H_2O/XO_2$: 1/1 to 500/1, wherein Y is a trivalent metal, $M^+$ is an alkali metal, X is a tetravalent element, and R is an organic template.

The reaction mixture is prepared and maintained under conditions effective for the crystallization of the porous ZSM-48.

The method employs heterostructural, zeolite seeds, other than ZSM-48 and ZSM-50, in a hydrothermal reaction. Examples of suitable seeds include heterostructural zeolite ZSM-5, ZSM-11, ZSM-12, Beta, X and Y zeolites, and colloidal BEA seeds.

It has been unexpectedly discovered that the use of heterostructural seeds in the reaction promotes more aluminum incorporation into the framework of the ZSM-48 crystal. It also suppresses the formation of impurities and fibrous morphology crystals. The resulting product exhibits highly pure ZSM-48 crystals with a ratio of $SiO_2/Al_2O_3$ of less than 150/1, preferably less than about 70/1, and more preferably less than about 50/1. The product is substantially free from impurities such as ZSM-50 and/or Kenyaite impurities typically found in products made using conventional methods. It is also substantially free of any fibrous morphology crystals, another prior art problem. It also has been discovered that when the non ZSM-48 seeds are colloidal BEA seeds, the inventive ZSM-48 crystals have a cross morphology.

BRIEF DESCRIPTION OF THE DRAWINGS

FIG. 2 is a SEM of a ZSM-48 product having a $SiO_2/Al_2O_3$ of from about 70/1 to about 150/1. The product is an agglomerate of small irregularly shaped crystals.

FIG. 3 is a SEM of a ZSM-48 product having a $SiO_2/Al_2O_3<70/1$. The product is an agglomerate of mixed needle and small crystals.

DETAILED DESCRIPTION OF THE INVENTION

Figure 1:
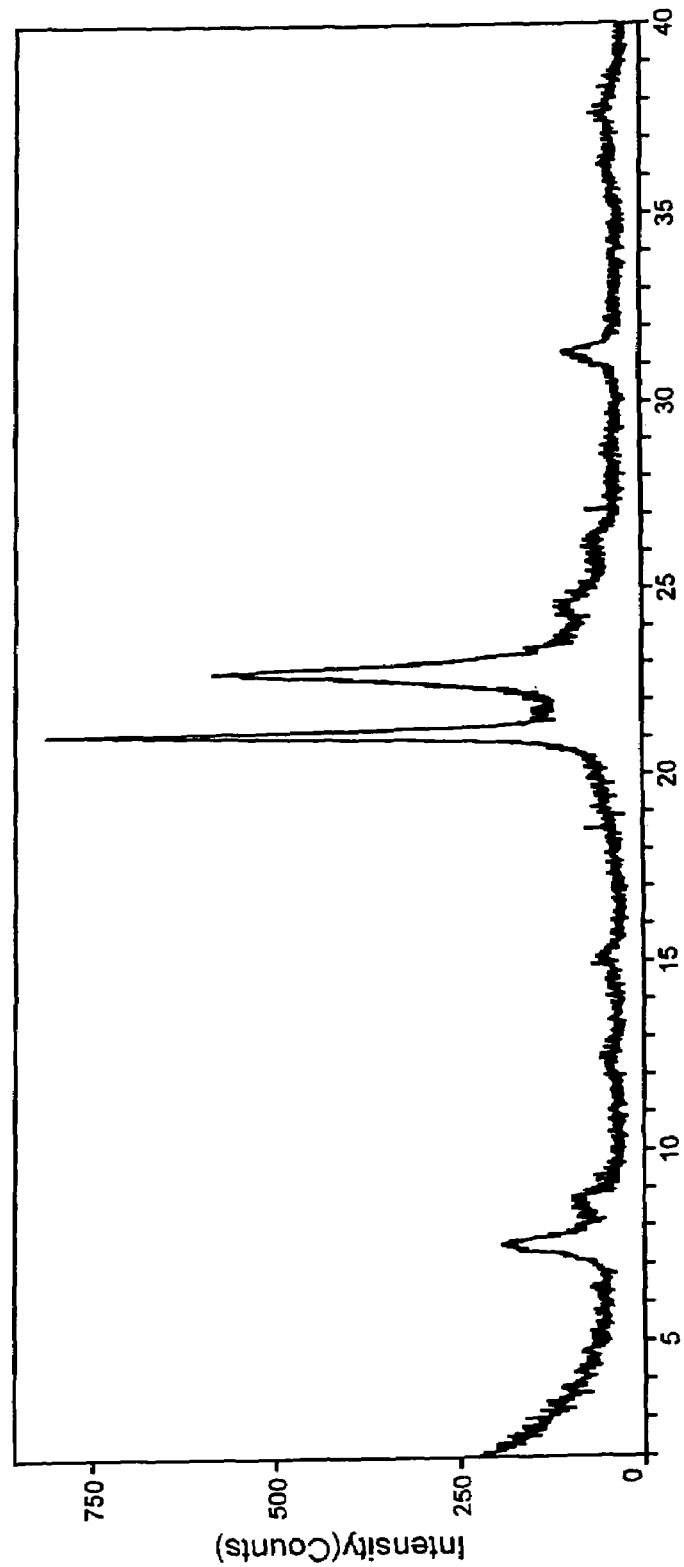
FIG. 1 is an x-ray diffraction pattern of a ZSM-48 prepared according to an embodiment of this invention.

The preparation process comprises mixing in an aqueous medium: a source or an alkali or alkaline earth metal M, preferably sodium; at least one source of at least one tetravalent element X, preferably selected from silicon, and germanium, at least one source of at least one trivalent element Y, preferably selected from aluminum, gallium, boron, iron, titanium, vanadium, and zirconium, at least one template material R selected from nitrogen-containing organic compounds; and, heterostructural, non ZSM-48 zeolite seeds. Examples of suitable seeds are ZSM-5, ZSM-11, ZSM-12, Beta, X and Y zeolites, and colloidal BEA. Effective amounts of the various components are added to form a reaction mixture having the following molar composition:

TABLE 1

| mol/mol | Preferred Range | More Preferred Range | Most Preferred Range |
| --- | --- | --- | --- |
| $XO_2/Y_2O_3$ | 20–2500/1 | 30–500/1 | 40–200/1 |
| $H_2O/XO_2$ | 1–500/1 | 10–100/1 | 15–60/1 |
| $OH^-/XO_2$ | 0–2.0/1 | 0.02–0.5/1 | 0.1–0.5/1 |
| $M^+/XO_2$ | 0–2.0/1 | 0.02–0.8/1 | 0.1–0.6/1 |
| $R/SiO_2$ | 0.001–5.0/1 | 0.005–1.0/1 | 0.01–0.5/1 |

The seeds may be used in amounts from about 0.01 wt ppm to about 5 wt/o, preferably from about 0.01 wt ppm to about 2 wt %, and more preferably from about 0.05 wt ppm to about 1 wt % based on the total amount of the reaction mixture. When using colloidal BEA seeds it is especially preferred to use them in an amount ranging from about 0.01 wt ppm to about 0.1 wt %.

Examples of suitable template materials include organic linear nitrogen compounds, such as linear diamine alkanes, of which 1.6 diamino hexane and 1,8 diamino octane are representative examples and linear diquaternary alkyl ammonium compounds, of which hexamethonium salts are an example.

The reaction mixture is heated to a preferred temperature of from about 212° F. (100° C.) to about 482° F. (250° C.), more preferably from about 302° F. (150° C.) to about 338° F. (170° C.). The reaction pressure is preferably maintained from about 1 atm to about 15 atm, and more preferably about 3 atm to about 8 atm. The heating can be done using any conventional vessel, continuous or batch type, such as autoclaves or static or rocking bomb reactors. Preferably, the mixture is stirred during the heating step via conventional stirring means. Sufficient mixing energy may be used to effectively mix the various components of the reaction mixture to form a macroscopically homogeneous mixture. The mixture is maintained under effective crystallization conditions until the ZSM-48 crystals are formed. The crystallization time may vary depending on a number of factors from a few minutes to many hours, typically from about 20 to about 500 hours and more typically from about 40 to about 240 hours, or until the reaction is over and zeolite crystals have formed.

The product is filtered using suitable conventional filter means and washed with deionized water (DI). Subsequent operations may include drying, calcining and ion exchange. XRD analysis of the product shows a pure phase ZSM-48 topology substantially free of any impurities. Scanning electron microscopy analysis of the product shows that it is composed of agglomerates of small crystals with an average crystal size of from about 0.01 to about 1.0 microns, and more preferably from about 0.01 to about 0.05 microns. Importantly, SEM analysis shows that the product has no detectable levels of fibrous morphology crystals. The method may further comprise converting the product crystals into their hydrogen form. For example, this can be done by contacting the crystals with an ammonium nitrate solution, preferably at room temperature, followed by drying and calcinating steps. The drying and calcining steps include heating via conventional means to conventional temperatures. Preferably, the inventive product ZSM-48 crystals have a $XO_2/Y_2O_3$ molar ratio typically less than about 150/1, preferably of from about 30–150, and more preferably of from about 40–90. It is especially preferred that X is Si and Y is Al.

One embodiment of the invention is directed to a method for making pure phase, highly active ZSM-48 crystals. The method comprises mixing effective amounts of water, hexamethonium chloride, ultrasil PM, sodium aluminate, sodium hydroxide solution, and non-ZSM-48 and non-ZSM-50 crystal seeds. The effective amounts of the various components can be readily determined by a person skilled in this art to form a mixture having the desired composition.

The seeds may be introduced at any point in the preparation. They may be introduced at the same time as the silicon and aluminum sources, or as the template. They may also be introduced first into an aqueous mixture, or they may be introduced after introducing the silicon and aluminum sources and/or the template. Preferably, the seeds may be added after at least partial homogenization of the aqueous mixture containing the aluminum and silicon sources and the template.

The seed particle size may have an influence on the synthesis process. The term "seed particle" means either a seed crystal or an agglomerate of seed crystals. Thus, the size of at least a major portion of the seed particles introduced during preparation of the zeolitic material is in the range of from about 0.01 to about 5.0, preferably in the range of from about 0.02 to about 1.0 $\mu$m.

Suitable silicon sources can be any one in normal use envisaged for zeolite synthesis, for example, solid powdered silica, silicic acid, colloidal silica or dissolved silica. Powdered silicas which can be used include precipitated silicas, in particular those obtained by precipitation from a solution of an alkali metal silicate such as "Zeosil" or "Tixosil" produced by Rhone-Poulenc, fumed silicas such as "Aerosil" produced by Degussa and "Cabosil" produced by Cabot, and silica gels. Colloidal silicas with a variety of granulometries can be used, such as those sold under trademarks "LUDOX" from Dupont, and "SYTON" from Monsanto.

Suitable dissolved silicas that can be used are commercially available soluble glass or sodium silicates containing 0.5 to 6.0 preferably 2.0 to 4.0 moles of $SiO_2$ per mole of alkali metal oxide and silicates obtained by dissolving silica in an alkali metal hydroxide, a diquaternary hydroxide, ammonium hydroxide, ammonium halide or a mixture thereof.

Suitable aluminum sources include sodium aluminates, aluminum salts, for example chloride, nitrate or sulfate aluminum salts, aluminum alcoholates or alumina preferably in a hydrated or hydratable form, such as colloidal alumina, pseudoboehemite, boehemite, gamma alumina or a trihydrate. Mixtures of the sources cited above may be used, as well as combined sources of silicon and aluminum such as amorphous silica-aluminas or certain clays.

The inventive ZSM-48 crystals can be used in many catalyst applications including: dewaxing, olefin isomerizations, or near linear olefin catalyst systems. Their use is advantageous because of high activity, and their small, non-fibrous crystal morphology.

The following Examples are provided to further illustrate the inventive method and crystals and should not be construed as limiting the scope of the invention which is delineated in the appended claims.

EXAMPLE 1

Preparation of ZSM-48 Seeding with ZSM-12

A mixture was prepared from 1100 g of water, 32 g of hexamethonium chloride (56% solution) template, 225.5 g of Ultrasil PM, 14.2 of sodium aluminate solution (45%), and 45.1 g of 50% sodium hydroxide solution. Then 10 g of ZSM-12 seed ($SiO_2/Al_2O_3$~49.2) was then added to the mixture. The mixture had the following molar composition:

| | | |
|---|---|---|
| $SiO_2/Al_2O_3$ | = | 89.9 |
| $H_2O/SiO_2$ | = | 18.75 |
| $OH^-/SiO_2$ | = | 0.178 |
| $Na+/SiO_2$ | = | 0.178 |
| Template/$SiO_2$ | = | 0.019 |

The mixture was reacted at 320° F. (160° C.) in a 2 liter autoclave with stirring at 250 RPM for 48 hours. The product was filtered, washed with deionized (DI) water and dried at 250° F. (120° C.). The x-ray diffraction (XRD) pattern of the as-synthesized material shows pure phase ZSM-48 topology. The scanning electron microscope (SEM) of the as-synthesized material shows that the sample was composed of agglomerates of small crystals (with an average crystal size of about 0.05 microns) and trace of crystals with needle morphology. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 78/1.

EXAMPLE 2

Preparation of ZSM-48 Seeding with ZSM-11

A mixture was prepared from 1000 g of water, 25 g of hexamethonium chloride (56% solution) template, 190 g of Ultrasil PM, 10 g of sodium aluminate solution (45%), and 33.33 g of 50% sodium hydroxide solution. Then 10 g of ZSM-11 seed ($SiO_2/Al_2O_3$~27/1) was then added the mixture. The mixture had the following molar composition:

| | | |
|---|---|---|
| $SiO_2/Al_2O_3$ | = | 106 |
| $H_2O/SiO_2$ | = | 20.08 |
| $OH-/SiO_2$ | = | 0.165 |
| $Na+/SiO_2$ | = | 0.165 |
| Template/$SiO_2$ | = | 0.018 |

The mixture was reacted at 320° F. (160° C.) in a 2 liter autoclave with stirring at 250 RPM for 48 hours. The product was filtered, washed with deionized (DI) water and dried at 250° F. (120° C.). The XRD pattern of the as-synthesized material shows pure phase ZSM-48 topology. The SEM of the as-synthesized material shows that the material was composed of agglomerates of small crystals (with an average crystal size of about 0.05 microns). The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 78.8.

EXAMPLE 3

Preparation of ZSM-48 Seeding with Beta Crystal

A mixture was prepared from 1000 g of water, 25 g of hexamethonium chloride (56% solution) template, 190 g of Ultrasil PM (a precipitated silica powder produced from Degussa), 10 g of sodium aluminate solution (45%), and 33.33 g of 50% sodium hydroxide solution. Then 10 g of Beta seed ($SiO_2/Al_2O_3 \sim 35/1$) was then added the mixture. The mixture had the following molar composition:

| | | |
|---|---|---|
| $SiO_2/Al_2O_3$ | = | 106 |
| $H_2O/SiO_2$ | = | 20.08 |
| $OH^-/SiO_2$ | = | 0.165 |
| $Na+/SiO_2$ | = | 0.165 |
| $Template/SiO_2$ | = | 0.018 |

The mixture was reacted at 320° F. (160° C.) in a 2 liter autoclave with stirring at 250 RPM for 48 hours. The product was filtered, washed with deionized (DI) water and dried at 250° F. (120° C.). The XRD pattern of the as-synthesized material shows pure phase of ZSM-48 topology. The SEM of the as-synthesized material shows that the material was composed of agglomerates of small crystals (with an average crystal size of about 0.05 microns). The as synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 87.2.

EXAMPLE 4

Preparation of ZSM-48 Seeding with Beta Crystal

A mixture was prepared from 11000 g of water, 320 g of hexamethonium chloride (56% solution) template, 2255 g of Ultrasil PM, 126 g of sodium aluminate solution (45%), and 421 g of 50% sodium hydroxide solution. The 100 g of Beta seed ($SiO_2/Al_2O_3 \sim 35/1$) was then added the mixture. The mixture had the following molar composition:

| | | |
|---|---|---|
| $SiO_2/Al_2O_3$ | = | 100.4 |
| $H_2O/SiO_2$ | = | 18.73 |
| $OH^-/SiO_2$ | = | 0.175 |
| $Na+/SiO_2$ | = | 0.175 |
| $Template/SiO_2$ | = | 0.019 |

The mixture was reacted at 320° F. (160° C.) in a 5 gallon autoclave with stirring at 250 RPM for 28 hours. The product was filtered, washed with deionized (DI) water and dried at 250° F. (120° C.). The XRD pattern of the as-synthesized material shows pure phase ZSM-48 topology. The SEM of the as-synthesized material shows that the material was composed of agglomerates of small crystals (with an average crystal size of about 0.05 microns). The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 81.32.

EXAMPLE 5

Preparation of ZSM-48 from Beta Seed

A mixture was prepared from 1200 g of water, 40 g of hexamethonium chloride (56% solution) template, 228 g of Ultrasil PM, 16 g of sodium aluminate solution (45%), 1.3 g of 98% $H_2SO_4$ solution, and 40 g of 50% sodium hydroxide solution. Then 10 g of Beta seed ($SiO_2/Al_2O_3 \sim 35/1$) was then added the mixture. The mixture had the following molar composition:

| | | |
|---|---|---|
| $SiO_2/Al_2O_3$ | = | 81 |
| $H_2O/SiO_2$ | = | 20 |
| $OH^-/SiO_2$ | = | 0.172 |
| $Na+/SiO_2$ | = | 0.165 |
| $Template/SiO_2$ | = | 0.022 |

The mixture was reacted at 320° F. (160° C.) in a 2 liter autoclave with stirring at 250 RPM for 72 hours. The product was filtered, washed with deionized (DI) water and dried at 250° F. (120° C.). The XRD pattern of the as-synthesized material shows the typical pure phase ZSM-48 topology. The SEM of the as-synthesized material shows that the material was shaped composed of agglomerates of mixed needle and small irregularly crystal crystals. The as-synthesized crystals were converted into the hydrogen form by two ion exchanges with ammonium nitrate solution at room temperature, followed by drying at 250° F. (120° C.) and calcination at 1000° F. (540° C.) for 6 hours. The resulting ZSM-48 crystals had a $SiO_2/Al_2O_3$ molar ratio of 67.7.

EXAMPLE 6 (COMPARATIVE)

Preparation of ZSM-48 without Adding Beta Seed

The same reactants and procedure as Example 5 were used, except that no Beta crystal was added as seeding agent. The XRD pattern of the as-synthesized material shows the typical ZSM-48 topology and the trace of ZSM-50 impurity was identified.

The above examples show that pure phase, high activity ZSM-48 crystals with $SiO_2/Al_2O_3<150/1$ can be prepared with the addition of heterostructural, non ZSM-48 seed crystals, such as ZSM-5, ZSM-11, ZSM-12, beta zeolites in hydrothermal reactions. These added seeding crystals appear to change the kinetics of the crystallization process and promote the crystallization of the desirable ZSM-48 structure, while suppressing the formation of impurities such as ZSM-50. Also, substantially no detectable amounts of crystals with fibrous morphology were observed in the synthesized products. Crystal morphology varied based on $SiO_2/Al_2O_3$ ratio. For crystals with ratios from about 70/1 to about 150/1, agglomerates of small irregularly shaped crystals were observed. $SiO_2/Al_2O_3$ ratios below 70 produced agglomerates of mixed needle and small irregularly shaped crystals.

EXAMPLE 7

Preparation of Cross Morphology ZSM-48 Crystals

A colloidal BEA slurry was prepared by combining 210.8 gm of tetraethylammonium hydroxide (40% solution) 13.88 gm Al(NO$_3$)$_3$9H$_2$O and 68.66 gm silica acid (10.2% water). The mixture was boiled for 10 mins and then heated at 70° C. for 37 days. The product was washed with water to a pH of the last wash water of 11.2. After washing the crystals were re-dispersed in demineralized water and stored as such. Before use as seeds the slurry was freshly diluted with water.

ZSM-48 crystals with cross morphology were prepared in three separate runs using very small and different seeding levels of colloidal BEA seeds. The composition of the synthesis mixture was:

0.71Na$_2$O/3R*/10SiO$_2$/376H$_2$O wherein the template R* was 1,6 diaminohexane. The different seeding levels, and synthesis times that were used resulted in different size crystals as shown in the following table. For comparative purposes a run without BEA seeding was conducted and is included in the table.

| Run | Seeding Level (wtppm)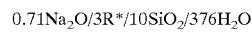 | Synthesis Time at 150° C. | Crystal Size (μm) |
|---|---|---|---|
| 1 | — | 72 hours | amorphous product |
| 2 | 1.1 | 24 hours | 3.5 |
| 3 | 0.56 | 30 hours | 4.5 |
| 4 | 0.016 | 30 hours② | 10 |

① colloidal BEA slurry
② still some amorphous material present

Figure 4:
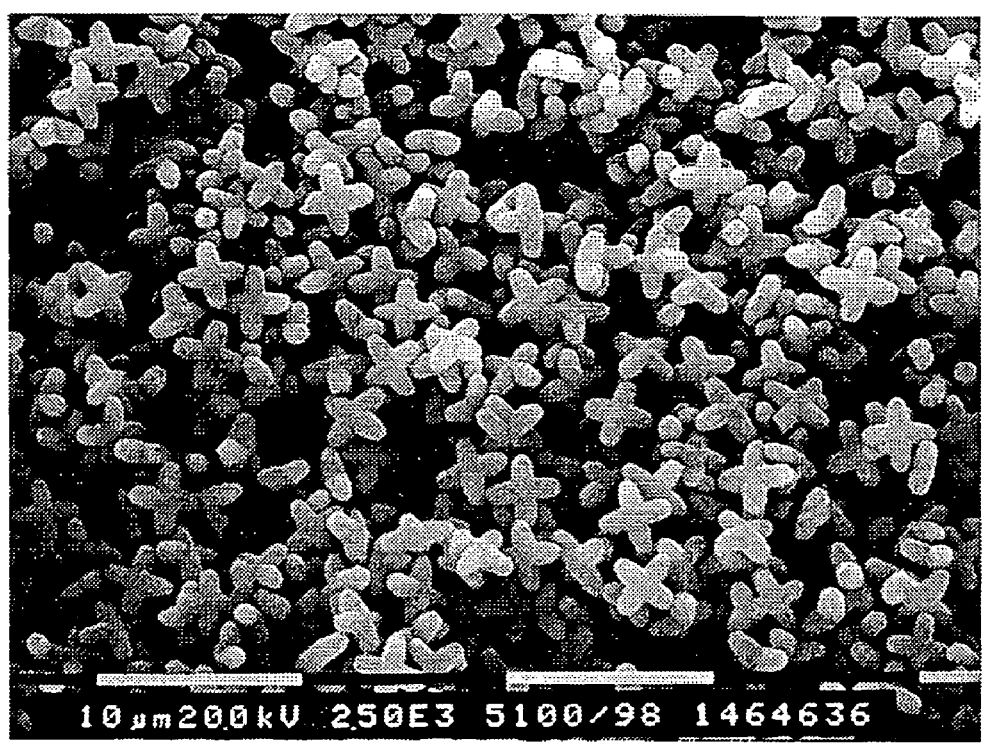
FIG. 4 is a SEM of a cross morphology ZSM-48 crystals made according to an embodiment of the invention.
Figure 5:
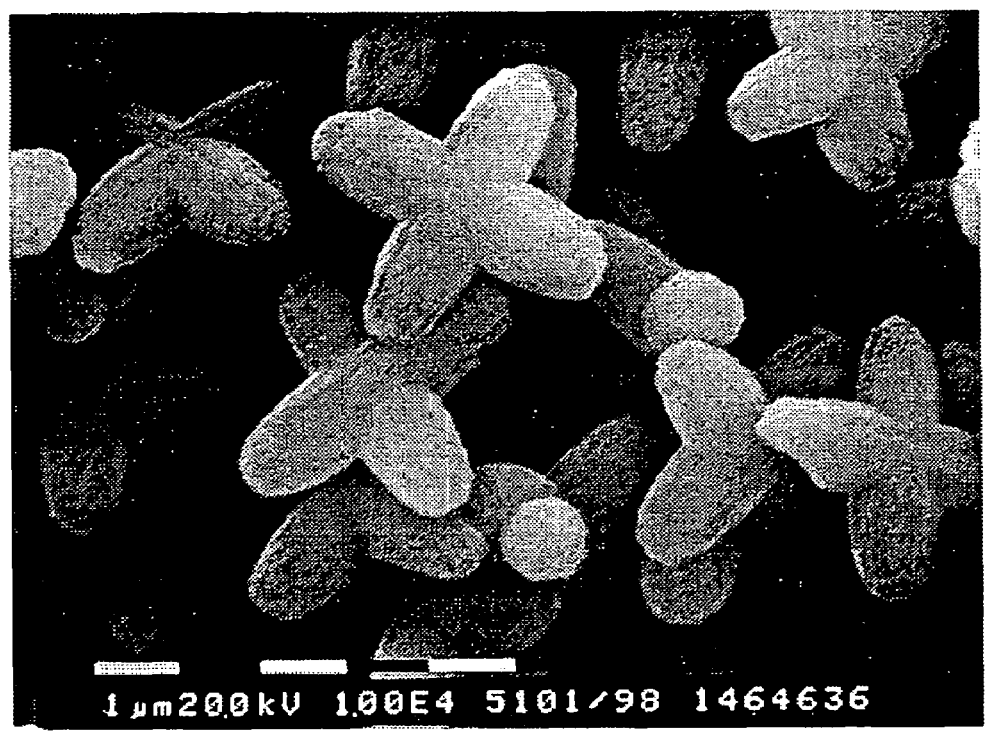
FIG. 5 is a SEM of the cross morphology ZSM-48 crystals shown in FIG. 4 shown at a greater magnification.

FIGS. 4 and 5 show the cross morphology of the ZSM-48 crystals.

EXAMPLE 8

Preparation of Cross Morphology ZSM-48 Crystals

Three separate batches of ZSM-48 crystals with cross morphology were prepared using a mixture that was prepared from 10.51 gm NaOH, 2.26 gm Al$_2$(SO$_4$)$_3$18H$_2$O, 252.27 gm Ludox AS-40 (40% SiO$_2$ in H$_2$O), 76.75 gm 1,8 diamino octane template and 358.8 gm H$_2$O. Then the colloidal BEA slurry as prepared in Example 7 was freshly diluted with water and added in the same amounts as in Example 7. After mixing for about 5 min. the gel was heated in an autoclave from room temperature to 150° C. in 2 hrs and then kept at that temperature for 20 hrs. After cooling to room temperature the product was washed with water until the wash water had a pH of about 9.5. The washed product was then dried at 120° C. XRD showed excellent crystallinity. Also, crystal size varied as in Example 7 depending upon the amount of colloidal seeds used.

What is claimed is:

1. Pure phase ZSM-48 crystals having a XO$_2$/Y$_2$O$_3$ ratio of less than about 150/1 and free from ZSM-50 and Kenyaite impurities having a diameter of less than about 1 micron and being substantially free of fibrous morphology.

2. The pure phase ZSM-48 crystals of claim 1 having a XO$_2$/Y$_2$O$_3$ ratio of from about 40/1 to about 150/1.

3. The pure phase ZSM-48 crystals of claim 1 wherein X is at least one of Si and Ge and Y is at least on of Al, Ga, B, Fe, Ti, V and Zr.

4. The pure phase ZSM-48 of claim 1 wherein X is Si and Y is Al.

5. A method for making ZSM-48 crystals, the method comprising:
   mixing effective amounts of heterostructural, zeolite seeds, selected from the group consisting of ZSM-5, ZSM-11, ZSM-12, colloidal BEA, Beta, X and Y zeolites, at least one source of a tetravalent element X, at least one source of a trivalent element Y, an alkali or alkaline earth metal M, and at least one organic template material R;
   to form a reaction mixture having in terms of mole ratios of oxides the following composition:

| | |
|---|---|
| XO$_2$/Y$_2$O$_3$ | 20/1–2500/1 |
| OH/XO$_2$ | 0/1–2.0/1 |
| H$_2$O/XO$_2$ | 1/1–500/1 |
| M$^+$/XO$_2$ | 0/1–2.0/1 |
| R/XO$_2$ | 0.001/1–5.0/1 | and maintaining said reaction mixture under effective crystallization conditions for a time sufficient to form ZSM-48 crystals.

6. The method of claim 5 wherein the organic template is selected from organic linear diquaternary alkyl ammonium compounds and linear diamino alkanes.

7. The method of claim 6 wherein the effective amount of non ZSM-48 seeds is in the range of 0.01 wt ppm to about 5 wt % based on the total weight reaction mixture.

8. The method of claim 7 wherein said heterostructural, zeolite seeds are selected from the group consisting of ZSM-5, ZSM-11, ZSM-12, Beta, X and Y zeolites, and mixtures thereof.

9. The method of claim 5 wherein the non ZSM-48 seeds are colloidal BEA seeds in an amount in the range of about 0.01 wt ppm to about 0.1 wt % whereby the ZSM-48 crystals have a cross morphology and crystal size of about 1 to 15 μm.

10. A method for preparing a pure phase ZSM-48, the method comprising:
   (a) preparing a reaction mixture comprising a source of silica, a source of alumina, an alkali metal or alkaline earth metal (M), water, an organic template (R), and heterostructural zeolite seeds other than ZSM-48 and ZSM-50 seeds,
   wherein said mixture, in terms of mole ratios of oxides, has the following composition:
   SiO$_2$/Al$_2$O$_3$: 30/1 to 500/1,
   M$^+$/SiO$_2$: 0.02/1 to 0.8/1,
   OH$^-$/SiO$_2$: 0.02/1 to 0.5/1,
   H$_2$O/SiO$_2$: 10/1 to 100/1, and
   R/SiO$_2$: 0.005/1 to 1.0/1
   wherein M$^+$ is an alkali metal; and R is the source of the organic structuring agents
   (b) maintaining said mixture under effective crystallization conditions until crystals of said ZSM-48 are formed.

11. The method according to claim 10, wherein said mixture has the following composition ranges:
   SiO$_2$/Al$_2$O$_3$: 40/1 to 200/1,
   M$^+$/SiO$_2$: 0.1/1 to 0.6/1,
   OH$^-$/SiO$_2$: 0.1/1 to 0.5/1,
   H$_2$O/SiO$_2$: 15/1 to 60/1, and
   R/SiO$_2$: 0.01/1–0.5/1.

12. The method according to claim 10, wherein the organic structuring agent is linear diquaternary ammonium compound.

* * * * *